July 23, 1957 — H. E. BAKER — 2,800,099

INFLATED MARKER

Filed Sept. 17, 1952

INVENTOR
HENRY E. BAKER

BY
AGENT

United States Patent Office 2,800,099
Patented July 23, 1957

2,800,099

INFLATED MARKER

Henry E. Baker, Northville, Mich.

Application September 17, 1952, Serial No. 310,025

4 Claims. (Cl. 116—63)

The present invention relates generally to markers, and more particularly to inflated markers for airport runways, and the like.

It is a serious problem in the management of airports, aircraft landing fields, and the like, properly to mark out the landing strip boundaries, the presence of obstructions or locations on the ground which are dangerous to aircraft, distances to ends of runways from various points along the runways, and the like, in order to increase the factor of safety in air travel. Various of these functions have heretofore been accomplished in various ways, but the devices employed have generally been heavy or bulky, and hence difficult to handle and to vary in location. Further, many such devices are rigid and present a danger to an aircraft in event of collision therewith.

It is a primary object of the present invention to provide markers for runways and landing spaces, for aircraft, which shall be more economical, lighter, more readily stored, and more readily moved, than has been the case hitherto, and which will not harm an aircraft in case of collision.

It is a more specific object of the invention to provide markers for aircraft runways, landing strips, and landing spaces, which comprise lightly inflated envelopes of tough, weather resistant material.

It is another specific object of my invention to provide markers for the purpose indicated, which shall be in the form of inflated cones, or other geometrical figures, having bottom supports of several different characters.

It is still another object of the invention to provide inflated markers which may conveniently carry numeral indications, or the like, to represent distance along runways, or the like.

It is still a further object of the invention to provide inflated markers of the general character indicated, in which a relatively thin rigid base member may be provided for the markers, to enable the markers to be secured readily to the ground.

It is another object of the invention to provide markers of the character indicated which shall be sufficiently light to rest without sinking, in soft snow.

The above and still further features, advantage and objects of the invention, will become apparent upon consideration of the following detailed disclosure of various specific embodiments thereof, especially when taken in conjunction with the accompanying drawings, wherein.

Figure 1:
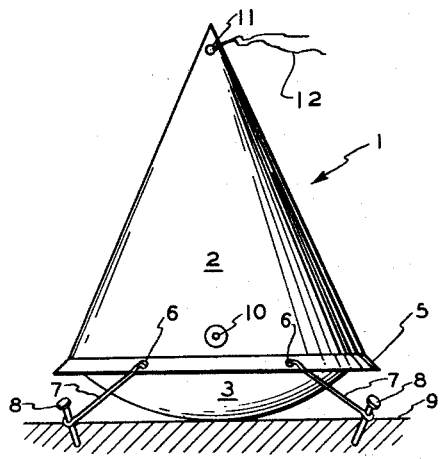
Figure 1 is a view in elevation of a first embodiment of the invention.

Referring now more specifically to the drawings, the reference numeral 1 identifies a generally conical marker for aircraft runways, landing areas, and the like, which may be fabricated of plastic sheets, such as vinylite, or the like. The marker 1 is comprised of an upstanding conical section 2, and a base section 3, in the shape of a section of a sphere. The base section 3 may be joined to the upstanding conical section 2, as by seam welding, or the like, leaving however a skirt 5, overhanging the base section 3.

The skirt 5 may be provided with reinforced apertures, as 6, through which may be secured guy lines, as 17, and these lines may be secured in turn to anchoring pegs, as 8, driven in the ground 9.

Markers, such as marker 1, may be fabricated in several colors, and may be so placed as to direct traffic at airports, or the like. For example, the markers may outline the usable part of a runway, especially under conditions of heavy snowfall, when, by virtue of their colors, the markers will be clearly visible. The markers may also be used to mark off danger spots, and to this end may be colored red. If desired, the markers may have numbers applied thereto to indicate distances, as from the ends of runways, or the like.

Referring again to the marker 1, a conventional air inlet valve 10 may be provided in the upstanding conical section 2, for inflating the marker. The base section 3 may be inflated, or, in the alternative, may comprise a weighted section, by providing sand or other weighting material therein. Additionally, a grommet 11 may be provided, to which may be secured a light streamer, 12, which may indicate wind directions, and thus assist pilots of aircraft in making landings.

Figure 2:
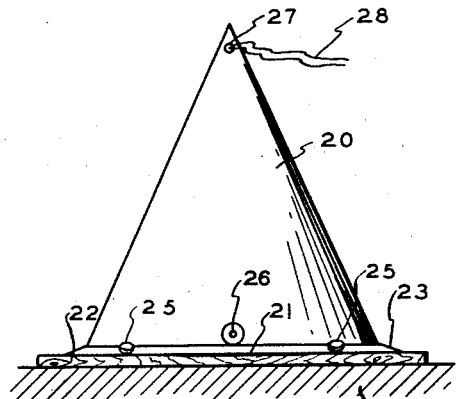
Figure 2 is a view in elevation of a modification of the device of Figure 1.
Figure 3:
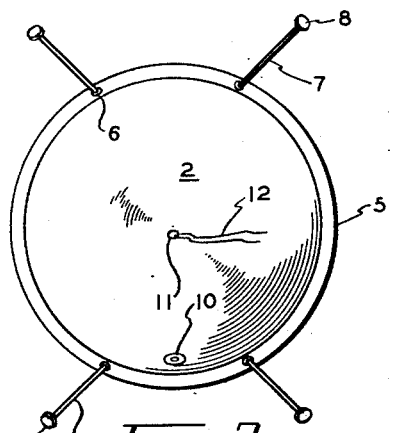
Figure 3 is a plan view of the device of Figure 1.
Figure 4:
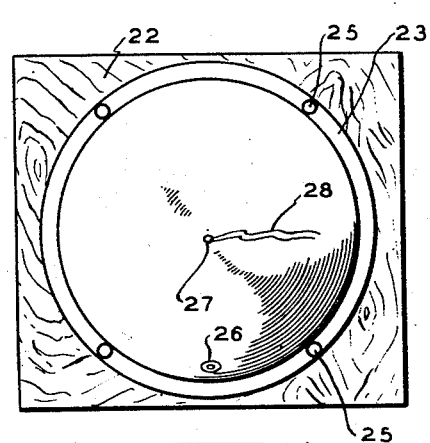
Figure 4 is a plan view of the device of Figure 2.

Figures 2 and 4 illustrate a modification of the device of Figures 1 and 3. In the device of Figures 2 and 4 a conical upstanding inflated member 20 is provided with a relatively flat base 21, and a skirt 22 surrounding the base. The flat base 21 is secured in any convenient fashion, as by the skirt 22, to a relatively thin wooden base member, as 23, which may be rectangular or circular, as desired, and which may in turn be secured to ground 24 by means of nails, as 25, or if desired may be unsecured to the ground except by its own weight. The device of Figures 2 and 4 may be utilized in the same manner as the device of Figures 1 and 3, and may be provided, as in the latter case, with an inlet air valve 26, and a grommet 27 for securing a light streamer 28.

Figure 5:
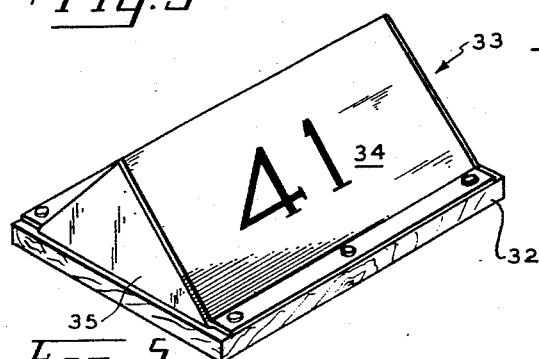
Figure 5 is a view in perspective of a further modification of the invention.

Still a further shape is illustrated in Figure 5, wherein the base 32 may be of wood or the like, and the inflated member 33 may have sharply rising walls 34, joining in this manner of a pup tent at line 35, and vertical closure walls 36. The latter may, as has been hereinbefore indicated, inform the pilot concerning distances pertinent to a landing or take-off, such as distance to end or beginning of runways, and by reason of its inclination is readily visible from the air. Different numbers may be utilized at different faces of the same device, to indicate different distances from opposite ends of a runway. The devices may be highly colored, and aid visibility against a background of snow, or the like, and may be differently colored on opposite sides so that directions may be indicated.

I have described several specific embodiments of my invention, for purposes of exposition thereof. It will be clear, however, that modifications of the invention as disclosed in various details, may be resorted to without departing from the true spirit of the invention as defined in the appended claims.

What I claim and desire to secure by Letters Patent of the United States is:

1. An airport marker, comprising, an inflated member having walls of thin flexible sheet material, a rigid base for said inflated member, and means piercing said rigid base and capable of being driven into ground by impact.

2. The combination in accordance with claim 1 wherein said inflated member is in the form of a cone.

3. An aircraft marker, comprising, an inflated cone, a base for said cone, a skirt secured to the base of said cone, said skirt having apertures for securing means.

4. An aircraft marker, comprising, an inflated member, a rigid flat base for said inflated member, said inflated member having at least one substantially plane extended wall making an angle of between 15° and 60° with said base, and intelligible signs on said extended wall.

References Cited in the file of this patent

UNITED STATES PATENTS

| | | |
|---|---|---|
| 1,833,124 | Rand | Nov. 24, 1931 |
| 1,867,811 | Conser | July 19, 1932 |
| 2,108,370 | Ernst | Feb. 15, 1938 |
| 2,237,599 | Gilman | Apr. 8, 1941 |
| 2,333,273 | Scanlan | Nov. 2, 1943 |
| 2,449,935 | Gilman | Sept. 21, 1948 |
| 2,561,016 | Ford | July 17, 1951 |